United States Patent [19]

Holy et al.

[11] Patent Number: 4,837,918
[45] Date of Patent: Jun. 13, 1989

[54] MACHINE TOOL ASSEMBLY

[75] Inventors: Franz Holy; Hans Nader, both of Stockerau, Austria

[73] Assignee: Maschinenfabrik Heid Aktiengesellschaft, Stockerau, Austria

[21] Appl. No.: 198,972

[22] Filed: May 26, 1988

[30] Foreign Application Priority Data

May 26, 1987 [AT] Austria .................. 1350/87

[51] Int. Cl.$^4$ ........................................... B23Q 3/157
[52] U.S. Cl. ...................................... 29/568; 29/27 C
[58] Field of Search .................... 29/568, 27 C, 26 A; 409/240; 82/2.5, 2.7

[56] References Cited

U.S. PATENT DOCUMENTS

| 3,477,121 | 11/1969 | Martin | 29/568 |
| 3,821,844 | 7/1974 | Harman et al. | 29/568 |
| 4,571,796 | 2/1986 | Sellner et al. | 29/568 X |
| 4,576,069 | 3/1986 | Bazuin | 409/133 |

Primary Examiner—Z. R. Bilinsky
Attorney, Agent, or Firm—Herbert Dubno

[57] ABSTRACT

An inclined-bed machine-tool assembly is provided having a tool carriage movable in the y-axis and bearing detachable tools, a tool-storage magazine for tools not in use, and a tool-loading means for moving the tools to and from the storage magazine and loading them into, as well as unloading them from, the tool carriage. The machine can be operated under programmatic control.

1 Claim, 2 Drawing Sheets

MACHINE TOOL ASSEMBLY

CROSS REFERENCE TO RELATED APPLICATION

This application is related to the commonly assigned copending application Ser. No. 06/853,727 filed 18 Apr. 1986, now U.S. Pat. No. 4,774,753 issued Oct. 4, 1988.

FIELD OF THE INVENTION

Our present invention relates to a machine tool assembly, especially an inclined-bed machine tool assembly, with means for delivering selected machining tools to, retrieving the machining tools in, and operating a plurality of such tools in an enclosed space.

BACKGROUND OF THE INVENTION

Most machine tools are designed to be operated with a stationary tool and a rotating workpiece. Turning tools and drills can be operated in this way.

If a power source is placed on a moveable carriage, then operation with a rotating tool, such as a milling tool, is made possible. Such tools are positioned in the plane of the workpiece, and generally can be moved back and forth lengthwise or longitudinally with respect to the workpiece. If the driving means of the workpiece is capable of automatically establishing exact angular positioning, then the workpiece can also be machined with high versatility along its circumference.

Tool loading and exchange systems are also known which make possible the rapid switching of boring and milling tools (see the aforementioned application and the literature cited in the file thereof). Inclined-bed machines are also known which have tool magazines which are either stationary or travel with the support carriage. Tool-loading devices with grippers are known which provide means for a tool-exchange operation.

In order to have a true y-axis machining capability, or in other words to make possible the machining of the workpiece in the y-direction, large machines have been developed with tool carriages which can be automatically moved under programmatic control in the y-direction.

So-called machining centers have been designed for complex cutting and machining operations, and these generally have multiple machining heads with stationary as well as rotating tools. These include for example turret heads, whose supply of tools can also make use of a tool exchanging system.

However, it has been very difficult with this sort of system to avoid collisions at some stage of the process of installing, changing, and operating the tools. Moreover, inexactness and errors, and even damage to the workpiece, are caused by the chips falling into the working area.

OBJECTS OF THE INVENTION

It is an object of the invention to provide a machine tool which is versatile and avoids the aforementioned disadvantages.

A more specific object is to provide a machine tool assembly which has the capacity for simple and efficient tool exchange but which has only one tool in operation at a time, thus avoiding collisions.

A further object is to provide a machine tool assembly wherein the tools not in use are stowed away and wherein the dropping of chips is controlled to avoid damage to the tools and the workpiece.

Yet another object of our invention is to make possible the rapid and smooth exchange of tools, and to use a single power source to power a variety of tools.

SUMMARY OF THE INVENTION

These and other objects of the invention which may become apparent hereinafter are achieved by providing a machine tool assembly, i.e. a machine tool, especially an inclined-bed machine tool, which has a support bed, particularly an inclined support bed, on which is mounted an assembly of support carriages, on which is moveably supported a tool carriage (tool-carrying carriage) which operates within a closable work space for the tools. The assembly of support carriages has a guiding and grasping means for the tool carriage within the constraints of which the tool carriage moves.

The tool carriage (tool-carrying carriage) is positioned so as to allow tool movement along the y-axis, and provided with receiving means for the mounting of detachable tools. The tool carriage also has means for supplying rotational power to the tool mounted on the tool carriage, such as a drive motor and gear train. The tool carriage is supplied with detachable tools from a tool magazine by a tool loading means; the tools not in use are detached and removed by the tool loading means through the closable opening affording communication with the work space and taken to the tool magazine where they are stowed.

In one feature of the invention, the guiding and grasping means for the tool carriage is a guiding surface and prism-shaped guideway, and the motion of the tool carriage is governed by a ball-bearing worm drive.

In another feature of the invention, the tool carriage has a single receptacle for the holding of turning, boring, or milling tools and also has next to this receptacle a conformal (form-fitting) linking means for linking the tool operatively to the rotatory power source.

Thus the loading of tools is carried out between the magazine and the working space through a tool-loading opening through the inclined bed into the working space, this opening having means for closure such as a sliding door. A tool-loading device such as an arm or bar penetrates through this tool-loading opening.

In a further feature of the invention, the tool-loading device carries the tools by way of a double-gripping device which can be rotationally switched between two positions, one of the two gripping parts of the device being employed to bring the tool to be put in place, the other gripping part being employed to take away the tool being replaced.

If, in the prior-art type of machine, the tool carriage were to be positionable in the y-direction, the resultant risk of collision would be increased to an order of magnitude above that of the rotatable-turret machines. A similar adaptation of the prior art type of machine tool would result in an enhanced susceptibility to falling chips and to the throwing off of fragments whenever the tool head takes on a turning, drilling or milling tool.

By contrast, it is a feature of the present invention that there is only one tool at a time in the work space, thus obviating the risk of collision.

The single tool receptacle is used for turning, boring, or milling tools, and the rotating tool is tightly coupled torsionally to the rotational power source. This rotational power source is located away from the tool clamping and coupling means. The arrangement of the invention allows for the tool in the work space to be used for working in the y-axis direction. The falling chips are not able to disturb other tools, since the tools not in use are held in a tool magazine, to and from which the tools are transferred by a tool-loading device which penetrates through the inclined bed through a tool-loading opening.

In a further feature of the invention, an automatically programmed opening and closing door keeps the work space shut off from the tool magazine. A further door, as has hitherto been used with machine tools, can be provided on the front side of the machine tool. Thereby, despite the higher flexibility of the machine, nevertheless, collisions and the adverse influence of chips can be completely avoided. By making use of these features of the invention, highly accurate, trouble-free, and rapid machining is made possible.

More specifically a machine tool according to the invention comprises:
- a headstock and a tailstock positioned to receive a workpiece between them, at least the headstock being provided with means for rotating the workpiece about a generally horizontal axis;
- an inclined bed extending along the axis and formed with a longitudinal guideway parallel to the axis but located rearwardly of a vertical plane of the axis;
- moveable enclosure means cooperating with the bed and disposed forwardly of the plane and above the axis for enclosing a working space around the workpiece between the headstock and the tailstock;
- a longitudinal carriage shiftable on the longitudinal slide in a longitudinal-slide plane parallel to the axis but inclined to the vertical plane;
- a crossfeed carriage shiftable on the longitudinal carriage in a direction perpendicular to the direction of displacement of the longitudinal carriage on the longitudinal guideway but in a crossfeed plane parallel to the longitudinal-feed plane;
- a y-direction slide carriage mounted on the crossfeed carriage and displaceable in a direction perpendicular to crossfeed and longitudinal-feed planes, the carriages together forming a tool-carriage assembly;
- a single tool receiver formed on the y-direction slide carriage for detachable mounting of selective tools thereon;
- a tool drive on the tool-carriage assembly having a coupling located laterally of the tool receiver for formfitting connection of the tool drive to a tool detachably mounted on the tool receiver for rotating the tool;
- a closable opening formed in the bed and the enclosure means and communicating with a space rearwardly of the inclined bed;
- a tool magazine having a plurality of tools replaceably mounted thereon and selectively positionable at a location in alignment with the opening;
- a tool-transfer member linearly shiftable between the location and the opening; and
- a double gripper pivotable on the tool-transfer member for engagement of a tool at the location with one gripper portion, engagement of a tool on the receiver with another gripper portion, rotation of the gripper portions to enable the receiver to accept a tool from the magazine and the magazine to accept a tool from the receiver upon linear shifting of the tool-transfer member between the location and the opening.

BRIEF DESCRIPTION OF THE DRAWING

The above and other objects, features and advantages of the present invention will become more readily apparent from the following description, reference being made to the accompanying highly diagrammatic drawing in which.

SPECIFIC DESCRIPTION

Figure 1:
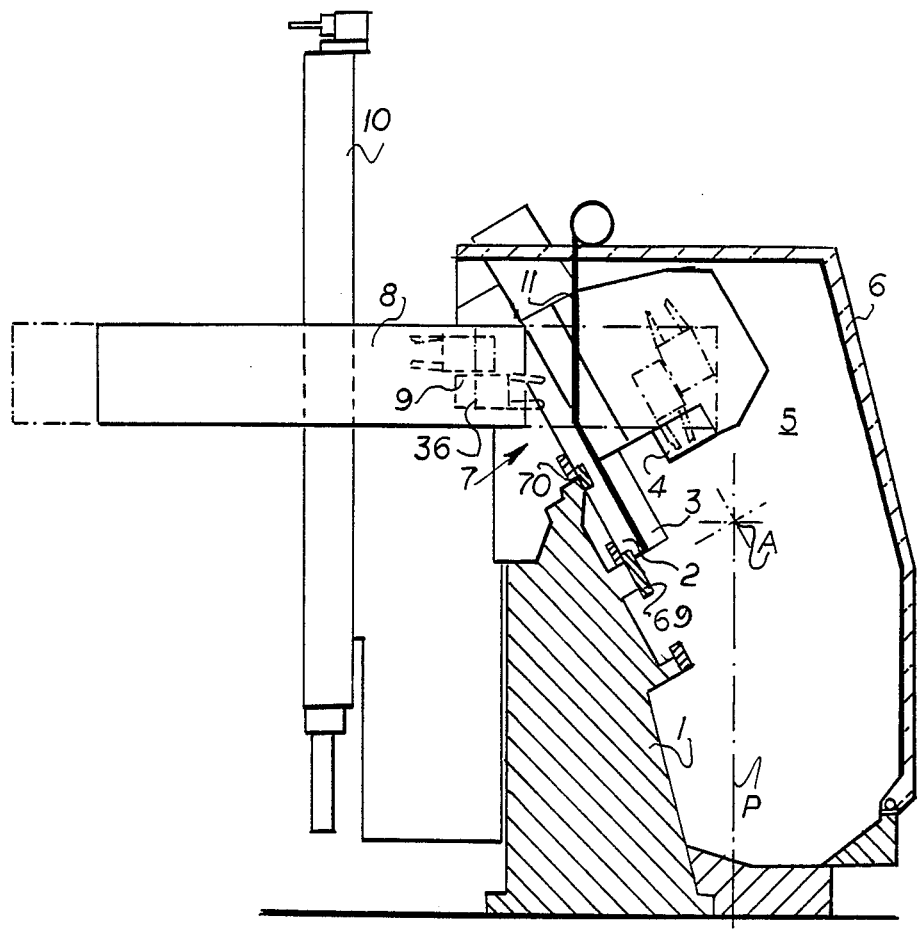
FIG. 1 is a vertical section through an inclined-bed machine with a tool magazine according to the invention.

The inclined-bed machine tool shown in FIG. 1 is provided with the usual type of inclined bed 1, upon which there is a support carriage 2, a transverse carriage 3, as well as a carriage system with a tool carriage 4 which is movable in the y-axis direction.

The working space 5 is closable from the front by a sliding door 6. In the inclined bed 1, an opening 7 is provided through which penetrates a tool loading device (a bar or arm) 8 on which is situated a double gripping device 9 which serves as rotating and withdrawal unit.

A tool magazine 10 is arranged to be within the range of action of the double-gripping device 9.

The opening 7 can be closed by a door 11 when the slidable or extensible tool loading device 8 is retracted.

Figure 2:
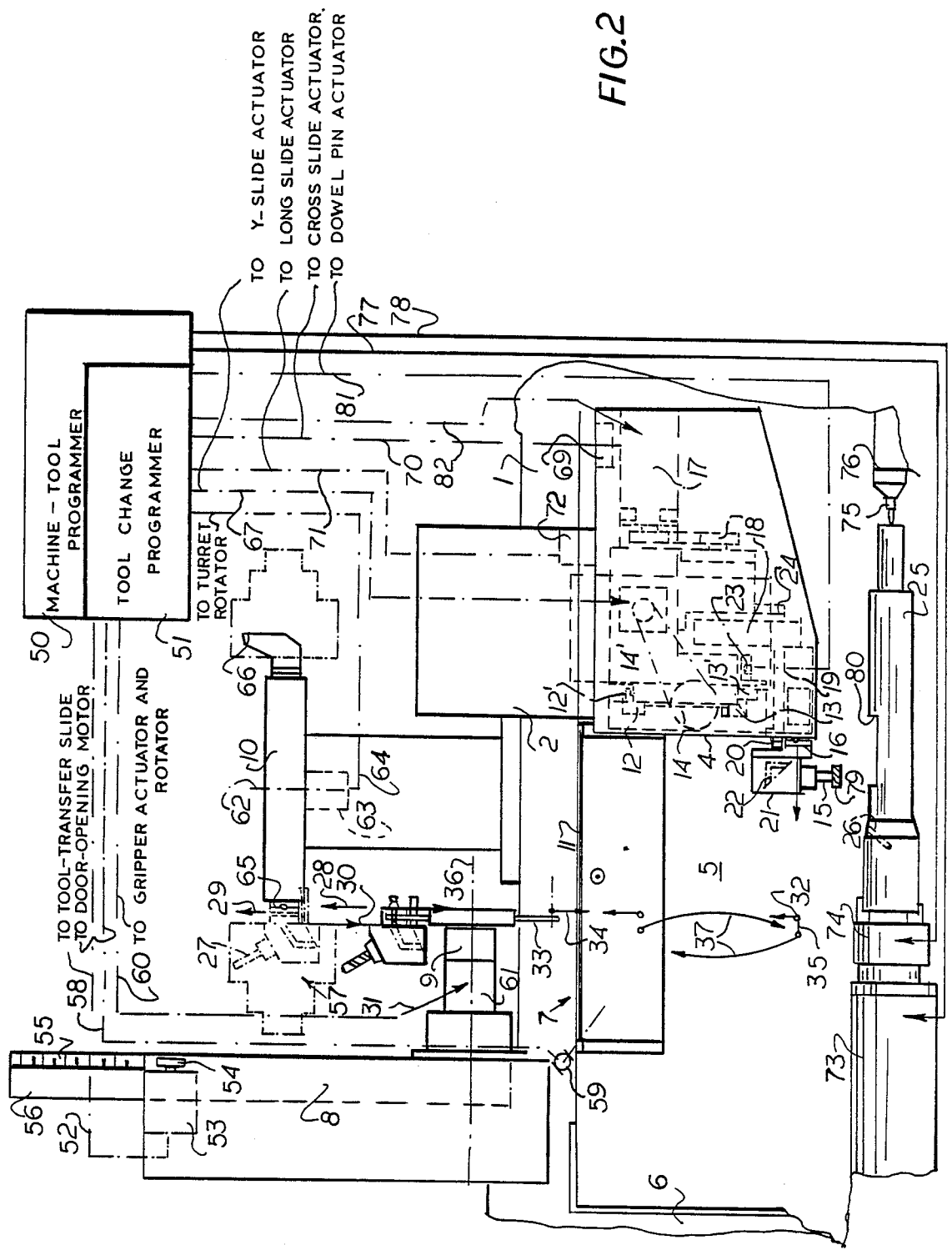
FIG. 2 is a top plan view of this machine with the working chamber open.

In FIG. 2 the spatial arrangement of the assembly as well as the structure of the y-carriage system can be seen. The tool carriage (y-carriage) 4 slides on the prismatically shaped members 12 and 13. The carriage guide has gripping and damping elements 12' and 13' arranged on it. The positioning of the carriage is controlled by a program and is carried out by a ball-bearing screw mechanism 14 (e.g. a circulating ball nut and spindle drive) operated by a driving means 14' (e.g. a motor and chain or belt drive). In the example shown, a milling cutter 15 is attached to the tool carriage by means of the detachable coupling 16 of a fast change system.

The driving of the milling cutter 15 is done by means of a motor 17 by way of a transmission 18 to the driving shaft 19, which by means of a conformal coupling 20, for example a spline shaft and spline socket, a gear or the like, is coupled to the tool holder 21 and in this case to an beveled angular gear coupling 22.

The drive means and the conformal coupling 20 are located next to the tool receptacle which is formed by the separable coupling 16. If a stationary tool for lathe type operation is needed from the magazine 10, then the tool carriage 4 is held stationary by a dowel pin 23. An independent odometer or distance-measuring device 24 is also provided.

If, on a piece 25 being worked, subsequent to a milling step in the y-axis direction, a bore 26 is to be produced, then a tool change is necessary. The tool change process is schematically represented in FIG. 2 by the route designated with arrows. First, the desired tool 27 in the magazine is brought into the loading position.

The delivery device 8 moves with its double gripper 9 to the magazine loading position (arrow 28) and seizes the tool 27 with one of its two grippers (i.e. by a gripping tongue), pulls it out (arrow 29) and moves it (arrow 30) to its waiting position 31, where it is represented in the Figure by full lines. This process is carried out during the time that the milling is being done by the tool 15.

At the end of the milling period, the carriage system (comprising the support carriage 2, the transverse carriage 3, and the y-axis tool carriage 4) moves the tool 15 to the exchange position 32.

The door 11 is then opened by the control system and the delivery device (arm) 8 moves (arrow 34) with its double gripper 9 into the working space 5. The free tongues 33 move over to the tool 15 and thusly to the gripping point of the separable coupling 16. The tool 15 is then pulled out (arrow 35). Then the double gripper is turned about its axis 36 by 180 degrees. Thus the tool 27 reaches the former position of the tool 15. Tool 27 is then shoved into the receptacle, and the separable coupling 16 becomes fixed.

The double gripper 9 moves out of the working space 5, and the door 11 is shut. While the carriage system is travelling to its working position for the new tool 27, the double gripper replaces the tool 15 which it had on its tongues back into the magazine 10 and it then gets the next tool required by the control program, withdrawing this tool from the magazine and bringing the tool to the waiting position 31.

More particularly, the machine-tool programmer 50, which can be a numerical control unit or microprocessor-based machine-tool programmer of a type used in conventional machining centers and for multiple-action programmed machine tools, can include a tool-change programmer 51 which has been illustrated as a block but in reality can be constituted by part of the programming for the machine-tool programmer 50, although it can be a separate controller.

The tool-change programmer is connected at 52 to an effector 53 such as a pulse motor which can have a pinion 54 meshing with a rack 55. The rack 55 can be provided on a horizontal guide 56 for the slide 8 carrying the motor 53 and pinion 54, the slide 8 forming the transfer member which is linearly displaceable to carry the double gripper 9 from a position in which the double gripper extends into the enclosure through the unblocked opening 7 and the position in which the gripper can pick up or deposit a tool at a location represented generally at 57 to which the magazine 10 can deliver a tool or at which the magazine 10 can pick up a delivered tool.

Another output 58 from the tool-change programmer is connected to a motor or effector 59 show only diagrammatically in FIG. 2 but adapted to displace the door 11 which normally blocks passage through the opening 7 during machining but which opens to permit tool change in the manner described.

An output 60 from the tool-change programmer extends to an effector 61 which may be a motor capable of rotating the double gripper 9 about its axis 36 and actuating the gripper tongs or jaws to seize a tool or release the latter. The tool-change programmer, therefore, can effect the door opening and tool-change movements which involve the slide 8 and the gripper 9. The magazine 10 can be a turret rotatable about a vertical axis 62 by a motor 63 driven in response to the tool-change programmer via a line 64 so that a proper tool for the next machining operation is positioned at the location 57 or a tool receiver 65 adapted to accommodate a tool to be transferred to the turret 10 from the gripper 9 is positioned at this location.

The tools may include chucks as shown in dot-dash lines in FIG. 2 or other elements such as the drill head or surface mill 27 or a boring or turning tool 66.

Of course, the tool-change programmer must also be capable of positioning the tool or tool holder at the location 32 at which tool change is effected in the manner described.

Accordingly the programmer 51 has an output 67 to the drive 14' which displaces the y-slide carriage 4, an output 68 driving a motor or effector 69 for the longitudinal fit of the longitudinal carriage 2 on the guides 69 and 70 of the inclined bed, and an output 71 to a motor 72 displacing the cross slide carriage 3 on the longitudinal carriage 2 in a plane parallel to that of the longitudinal carriage and like the plane of displacement of the longitudinal carriage, inclined to a vertical plane P through the axis A of rotation of the workpiece 25. The latter is held in a had stock 73 by a chuck 74 and also is supported by a center 75 of a tail stock 76. The chuck 74 may be operated by the machine-tool programmer 50 as represented by the line 77 if the machine tool is equipped with means (not shown) in changing the workpiece, while the head stock 73 can be controlled by the programmer as represented by line 78 for, for example, precisely positioning the workpiece so that a milling cutter 79 can form a recess or slot 80 therein.

The dowel pin 23 is brought into play by an effector controlled via line 81 by the tool-change programmer to hold the carriage 4 stationary as previously described when necessary, while yet another output 82 of the tool-change programmer initiates drive of the motor 17 when the tool is to be driven.

Thus it can be seen that there is no danger of collision of tools since only one is present in the enclosed space 5 at a time, and nevertheless efficient and rapid tool replacement can be achieved while permitting tools to be used which can be rotated.

We claim:

1. A machine tool, comprising:
    a headstock and a tailstock positioned to receive a workpiece between them, at least said headstock being provided with means for rotating said workpiece about a generally horizontal axis;
    an inclined bed extending along said axis and formed with a longitudinal guideway parallel to said axis but located rearwardly of a vertical plane of said axis;
    moveable enclosure means cooperating with said bed and disposed forwardly of said plane and above said axis for enclosing a working space around said workpiece between said headstock and said tailstock;
    a longitudinal carriage shiftable on said longitudinal slide in a longitudinal-slide plane parallel to said axis but inclined to said vertical plane;
    a crossfeed carriage shiftable on said longitudinal carriage in a direction perpendicular to the direction of displacement of said longitudinal carriage on said longitudinal guideway but in a crossfeed plane parallel to said longitudinal-feed plane;
    a y-direction slide carriage mounted on said crossfeed carriage and displaceable in a y-direction perpendicular to said crossfeed and longitudinal-feed planes, said carriages together forming a tool-carriage assembly;
    a circulating ball nut spindle device operatively connected with said y-direction slide carriage for displacing same in said y-direction;

a single tool receiver formed on said y-direction slide carriage for detachable mounting of selective rotatable tools thereon;

a tool drive on said tool-carriage assembly having a coupling located laterally of said tool receiver for formfitting connection of said tool drive to a tool detachably mounted on said tool receiver for rotating said tool;

a closable opening formed in said bed and said enclosure means and communicating with a space rearwardly of said inclined bed;

a tool magazine having a plurality of tools replaceably mounted thereon and selectively positionable at a location in alignment with said opening;

a tool-transfer member linearly shiftable between said location and said opening; and a double gripper pivotable on said tool-transfer member for engagement of a tool at said location with one gripper portion, engagement of a tool on said receiver with another gripper portion, rotation of said gripper portions to enable said receiver to accept a tool from said magazine and said magazine to accept a tool from said receiver upon linear shifting of said tool-transfer member between said location and said opening.

* * * * *